(12) United States Patent
Owsik et al.

(10) Patent No.: US 9,834,720 B2
(45) Date of Patent: Dec. 5, 2017

(54) LOW DOSE GAS HYDRATE INHIBITOR COMPOSITIONS

(71) Applicant: Ecolab USA Inc., Eagan, MN (US)

(72) Inventors: Izabela Owsik, College Station, TX (US); Alfred Hase, Aberdeen (GB)

(73) Assignee: Ecolab USA Inc., St. Paul, MN (US)

( * ) Notice: Subject to any disclaimer, the term of this patent is extended or adjusted under 35 U.S.C. 154(b) by 218 days.

(21) Appl. No.: 14/587,777

(22) Filed: Dec. 31, 2014

(65) Prior Publication Data

US 2016/0186039 A1 Jun. 30, 2016

(51) Int. Cl.
*C09K 8/52* (2006.01)

(52) U.S. Cl.
CPC .......... *C09K 8/52* (2013.01); *C09K 2208/22* (2013.01)

(58) Field of Classification Search
None
See application file for complete search history.

(56) References Cited

U.S. PATENT DOCUMENTS

| | | | |
|---|---|---|---|
| 4,178,434 A * | 12/1979 | Langdon | C08G 65/33306 528/405 |
| 5,076,364 A | 12/1991 | Hale et al. | |
| 5,491,269 A | 2/1996 | Colle et al. | |
| 6,107,531 A | 8/2000 | Colle et al. | |
| 6,331,508 B1 | 12/2001 | Pakulski | |
| 6,369,004 B1 | 4/2002 | Klug et al. | |
| 7,696,393 B2 | 4/2010 | Rivers et al. | |
| 7,879,767 B2 | 2/2011 | Baycroft et al. | |
| 7,893,009 B2 | 2/2011 | Leinweber et al. | |
| 2004/0110998 A1 | 6/2004 | Rivers et al. | |
| 2005/0261529 A1 | 11/2005 | Crosby et al. | |
| 2006/0237691 A1* | 10/2006 | Meier | C07C 217/08 252/397 |
| 2008/0214726 A1* | 9/2008 | Freeman | C08F 220/34 524/555 |
| 2009/0054268 A1 | 2/2009 | Leinweber et al. | |
| 2011/0240915 A1 | 10/2011 | Tian et al. | |

FOREIGN PATENT DOCUMENTS

| | | |
|---|---|---|
| EP | 1 717 288 A2 | 11/2006 |
| WO | 00/77070 A2 | 12/2000 |
| WO | 2010/045523 A1 | 4/2010 |
| WO | 2013/059058 A1 | 4/2013 |
| WO | 2014/065675 A1 | 5/2014 |
| WO | 2014/078163 A1 | 5/2014 |

OTHER PUBLICATIONS

International Search Report and Written Opinion dated Apr. 10, 2016 relating to PCT Application No. PCT/US2015/067593, 10 pages.

* cited by examiner

*Primary Examiner* — Jeffrey Washville
(74) *Attorney, Agent, or Firm* — Senniger Powers LLP (57) ABSTRACT

The present invention generally relates to one or more compositions and methods for inhibiting the formation of gas hydrate agglomerates in a fluid. The fluid may be contained, for example, in an oil or gas pipeline or refinery.

19 Claims, 2 Drawing Sheets

LOW DOSE GAS HYDRATE INHIBITOR COMPOSITIONS

FIELD OF THE INVENTION

The present invention generally relates to one or more compositions and methods for inhibiting the formation and growth of hydrate particles in a fluid containing hydrocarbon gas and water. The fluid may be contained, for example, in an oil or gas pipeline or refinery.

BACKGROUND OF THE INVENTION

Natural gas hydrates are crystalline solids composed of water and gas. In these solids, the gas molecules (guests) are trapped in water cavities (host) that are composed of hydrogen-bonded water molecules. Methane is the main gas in naturally occurring gas hydrates, however carbon dioxide, hydrogen sulfide, and less frequently, other hydrocarbons such as ethane and propane can be found within the hydrate structure. In 1934, Hammerschmidt determined that natural gas hydrates were blocking gas transmission lines, frequently at temperatures above the ice point. This discovery caused a more pragmatic interest in gas hydrates and led to the regulation of the water content in natural gas pipelines.

Gas hydrates can be easily formed during the transportation of oil and gas in pipelines under certain conditions. Factors affecting gas hydrate formation include gas composition, water content, temperature and pressure, particularly low temperature and high pressure. While these crystalline cage-like structures are small initially, they are able to agglomerate into solid masses called gas hydrate plugs. The formation of gas hydrates within a pipeline often results in lost oil or gas production, damage to transmission lines and equipment, and safety hazards to field workers.

Three types of hydrate inhibitors are currently available to the energy industry for controlling gas hydrates: thermodynamic hydrate inhibitors (THIs), kinetic hydrate inhibitors (KHIs), and anti-agglomerants (AAs). Thermodynamic inhibitors are substances that can reduce the temperature at which gas hydrates form at a given pressure and water content. Methanol and ethylene glycol are among the most common thermodynamic inhibitors used in the oil industry. However, thermodynamic inhibitors often have to be added in large amounts to be effective, typically in the order of several tens of percent by weight of the water present. Therefore, there is a substantial cost associated with transportation and storage of large quantities of THIs.

A more cost-effective alternative is the use of kinetic hydrate inhibitors and anti-agglomerants, which are known collectively as low-dosage hydrate inhibitors (LDHIs), reflecting the much lower dosage requirements compared with THIs.

Anti-agglomerants are surface active molecules that attach to and disperse fine gas hydrate crystals, preventing their agglomeration and growth into masses that could become plugs. When small gas hydrate crystals begin to form, AAs attach to them to make the surface hydrophobic, which mediates the capillary attraction between the crystals and water and disperses the crystals into the hydrocarbon phase. This results in a transportable slurry that can flow to the processing facility.

Typically, KHIs are low molecular weight polymers that adsorb on gas hydrate crystal faces and interfere with the nucleation and growth of gas hydrate crystals.

There is an ongoing need for compositions and methods that effectively prevent formation of gas hydrates in oil and gas extraction, transportation, and handling processes.

SUMMARY OF THE INVENTION

One aspect of the invention is a method for inhibiting gas hydrate formation or agglomeration in a fluid comprising a hydrocarbon and water. The method comprises adding to the fluid an effective amount of an inhibitor composition to inhibit gas hydrate formation in the fluid. The inhibitor composition comprises an polyamine derived from reaction of a first amine and a second amine of a tertiary amine of formula 1 or a quaternary amine of formula 2 having the structures of Formula 1

Formula 2 wherein $R_1$, $R_2$, and $R_3$, are each independently —$R_5$—Z or two or more of $R_1$, $R_2$, and $R_3$ together with the nitrogen atom form a heterocyclo group; $R_4$ is alkyl; $R_5$ is $C_1$ to $C_{20}$ alkylene, substituted $C_1$ to $C_{20}$ alkylene, arylene, aralkylene, or $C_1$ to $C_{20}$ alkylene wherein one or more of the —$CH_2$— groups of the alkylene group is replaced with an amide, a carbonyl, an ether, an ester, a cycloalkyl, or a heterocyclo functional group; $R_6$ is independently hydrogen or alkyl; and Z is —$NHR_6$, —OH, —$C(O)OR_6$, or —$C(O)NHR_6$; wherein the first amine is a diamine, a triamine, or a polyamine.

In the methods for inhibiting gas hydrate formation described herein, the inhibitor composition can further comprise a gas hydrate inhibitor agent.

When the inhibitor composition further comprises a gas hydrate inhibitor agent, the gas hydrate inhibitor agent can be a polyvinylcaprolactone, a polyvinylpyrrolidone, a dendrimeric polyesteramide derived from hexahydrophthalic anhydride, diisopropanol amine, and N,N-bis(3-dimethylaminopropyl)amine, a substituted polyethyleneimine, a polyoxyalkylenediamine, a dicarboxylic acid-polyol polyester, polycyclicpolyether polyol, hyperbranched polyester polyols having hydroxyl end groups, hyperbranched polyester polyamine, hyperbranched polyamidoamine, linear polyester polyamine, or a combination thereof.

Another aspect of the invention is an inhibitor composition comprising a gas hydrate inhibitor agent and polyamine derived from reaction of a first amine and a second amine of a tertiary amine of formula 1 or a quaternary amine of formula 2 having the structures of Formula 1

-continued

Formula 2 wherein $R_1$, $R_2$, and $R_3$, are each independently —$R_5$—Z or two or more of $R_1$, $R_2$, and $R_3$ together with the nitrogen atom form a heterocyclo group; $R_4$ is alkyl; $R_5$ is $C_1$ to $C_{20}$ alkylene, substituted $C_1$ to $C_{20}$ alkylene, arylene, aralkylene, or $C_1$ to $C_{20}$ alkylene wherein one or more of the —$CH_2$— groups of the alkylene group is replaced with an amide, a carbonyl, an ether, an ester, a cycloalkyl, or a heterocyclo functional group; $R_6$ is independently hydrogen or alkyl; and Z is —$NHR_6$, —OH, —$C(O)OR_6$, or —$C(O)NHR_6$; wherein the first amine is a diamine, a triamine, or a polyamine.

DETAILED DESCRIPTION OF THE INVENTION

Compositions and methods for inhibiting gas hydrate formation are provided to effectively control gas hydrate formation and plugging in hydrocarbon production and transportation systems. The methods for inhibiting gas hydrate formation comprise adding an effective amount of an inhibitor composition comprising polyamine to a fluid comprising a hydrocarbon and water. The methods may be applied to prevent, reduce or mitigate plugging of conduits, pipes, transfer lines, valves, and other places or equipment where hydrate agglomerates may form. Additionally, the gas hydrate inhibitor compositions described herein can comprise a polyamine and a gas hydrate inhibitor agent wherein the polyamine increases the efficacy of the gas hydrate inhibitor agent. The performance of the gas hydrate inhibitor composition is advantageous to provide protection from gas hydrate agglomeration that causes dangerous plugs in the oil and gas extraction system.

The invention is directed to a method for inhibiting gas hydrate formation in a fluid comprising a hydrocarbon and water. The method comprises adding to the fluid an effective amount of an inhibitor composition to inhibit gas hydrate formation in the fluid. The inhibitor composition comprises an polyamine derived from reaction of a first amine and a second amine of a tertiary amine of formula 1 or a quaternary amine of formula 2 having the structures of Formula 1

Formula 2 wherein $R_1$, $R_2$, and $R_3$, are each independently —$R_5$—Z or two or more of $R_1$, $R_2$, and $R_3$ together with the nitrogen atom form a heterocyclo group; $R_4$ is alkyl; $R_5$ is $C_1$ to $C_{20}$ alkylene, substituted $C_1$ to $C_{20}$ alkylene, arylene, aralkylene, or $C_1$ to $C_{20}$ alkylene wherein one or more of the —$CH_2$— groups of the alkylene group is replaced with an amide, a carbonyl, an ether, an ester, a cycloalkyl, or a heterocyclo functional group; $R_6$ is independently hydrogen or alkyl; and Z is —$NHR_6$, —OH, —$C(O)OR_6$, or —$C(O)NHR_6$; wherein the first amine is a diamine, a triamine, or a polyamine.

The invention is further directed to a method for inhibiting gas hydrate formation in a fluid comprising a hydrocarbon and water. The method comprises adding to the fluid an effective amount of an inhibitor composition to inhibit gas hydrate formation in the fluid. The inhibitor composition comprises an polyamine having repeat units of (i) formulae 10 and 30, (ii) formulae 20 and 30, and (iii) formulae 10, 20, and 30

Formula 10

Formula 20

Formula 30 wherein $R_4$ is alkyl; $R_5$ is $C_1$ to $C_{20}$ alkylene, substituted $C_1$ to $C_{20}$ alkylene, arylene, aralkylene, or $C_1$ to $C_{20}$ alkylene wherein one or more of the —$CH_2$— groups of the alkylene group is replaced with an amide, a carbonyl, an ether, an ester, a cycloalkyl, or a heterocyclo functional group, or two or more of the $R_5$ groups together with the nitrogen atom they are attached to form a heterocyclo group; $R_{10}$ is alkyl or substituted alkyl; $R_{11}$, and $R_{12}$ are independently hydrogen, alkyl, or substituted alkyl; and X is —NH—, —O—, —C(O)O—, or —C(O)NH—.

The inhibitor composition of the methods described herein can further comprise a gas hydrate inhibitor agent.

Another aspect of the invention is an inhibitor composition comprising a gas hydrate inhibitor agent and an polyamine derived from reaction of a first amine and a second amine of a tertiary amine of formula 1 or a quaternary amine of formula 2 having the structures of Formula 1

-continued

Formula 2 wherein $R_1$, $R_2$, and $R_3$, are each independently —$R_5$—Z or two or more of $R_1$, $R_2$, and $R_3$ together with the nitrogen atom form a heterocyclo group; $R_4$ is alkyl; $R_5$ is $C_1$ to $C_{20}$ alkylene, substituted $C_1$ to $C_{20}$ alkylene, arylene, aralkylene, or $C_1$ to $C_{20}$ alkylene wherein one or more of the —$CH_2$— groups of the alkylene group is replaced with an amide, a carbonyl, an ether, an ester, a cycloalkyl, or a heterocyclo functional group; $R_6$ is independently hydrogen or alkyl; and Z is —$NHR_6$, —OH, —$C(O)OR_6$, or —$C(O)NHR_6$; wherein the first amine is a diamine, a triamine, or a polyamine.

Yet another aspect of the invention is an inhibitor composition comprising a gas hydrate inhibitor agent and an polyamine having repeat units of (i) formulae 10 and 30, (ii) formulae 20 and 30, and (iii) formulae 10, 20, and 30

Formula 10

Formula 20

Formula 30 wherein $R_4$ is alkyl; $R_5$ is $C_1$ to $C_{20}$ alkylene, substituted $C_1$ to $C_{20}$ alkylene, arylene, aralkylene, $C_1$ to $C_{20}$ alkylene wherein one or more of the —$CH_2$— groups of the alkylene group is replaced with an amide, a carbonyl, an ether, an ester, a cycloalkyl, or a heterocyclo functional group, or two or more of the $R_5$ groups together with the nitrogen atom they are attached to form a heterocyclo group; $R_{10}$ is $C_1$ to $C_{20}$ alkylene, arylene, cycloalkylene, or $C_1$ to $C_{20}$ alkylene wherein one or more of the —$CH_2$— groups of the alkylene group is replaced with an amide, a carbonyl, an ether, an ester, functional group; $R_{11}$ and $R_{12}$ are independently hydrogen, alkyl, or substituted alkyl; and X is —NH—, —O—, —C(O)O—, or —C(O)NH—.

The gas hydrate inhibitor agent can be a polyvinylcaprolactone; a polyvinylpyrrolidone; a copolymer of a polyvinylcaprolactone and a polyvinylpyrrolidone; a terpolymer of a polyvinylcaprolactone, a polyvinylpyrrolidone, and a polyvinyl acetate; a dendrimeric polyesteramide derived from hexahydrophthalic anhydride; diisopropanol amine, and N,N-bis(3-dimethylaminopropyl)amine; a substituted polyethyleneimines; a polyoxyalkylenediamine; a dicarboxylic acid-polyol polyester; a polycyclicpolyether polyol; a hyperbranched polyester polyol having hydroxyl end groups; a hyperbranched polyester polyamine; a hyperbranched polyamidoamine; a linear polyester polyamine; or a combination thereof. Preferably, the gas hydrate inhibitor agent comprises a copolymer of a polyvinylcaprolactone and a polyvinylpyrrolidone; a terpolymer of a polyvinylcaprolactone, a polyvinylpyrrolidone, and a polyvinyl acetate; a copolymer of N-isopropyl(meth)acrylamide (NIPMA) and methacrylamidopropyltrimethylammonium chloride (MAPTAC); a N-isopropyl(meth)acrylamide polymer; or a combination thereof.

The gas hydrate inhibitor can be Inhibex® 501, Inhibex® 505, Inhibex® 101, Luvicap EG, Luvicap EG-HM, Luvicap 55W, or a combination thereof.

The first amine can be ethylene diamine, propylene diamine, butylene diamine, pentylene diamine, hexylene diamine, heptylene diamine, octylene diamine, nonylene diamine, decylene diamine, diethylene triamine, dipropylene triamine, dibutylene triamine, dipentylene triamine, dihexylene triamine, triethylene tetraamine, tripropylene tetraamine, tributylene tetraamine, tripentylene tetraamine, trihexylene tetraamine, tetraethylene pentamine, tetrapropylene pentamine, pentaethylene hexamine, pentapropylene hexamine, $N^1,N^2$-dimethylethane-1,2-diamine, $N^1,N^3$-dimethylpropane-1,3-diamine, $N^1,N^4$-dimethylbutane-1,4-diamine, $N^1,N^5$-dimethylpentane-1,5-diamine, $N^1,N^6$-dimethylhexane-1,6-diamine, p-diaminoethylbenzene, 1,4-diaminocyclohexane, or a combination thereof. Preferably, the first amine is ethylene diamine, 1,6-hexylene diamine, or a combination thereof.

The second amine can comprise a tertiary amine of formula 1.

Alternatively, the second amine can comprise a quaternary amine of formula 2.

When the second amine comprises a quaternary amine of formula 2, $R_4$ can be methyl, ethyl, or propyl.

When the second amine comprises a tertiary amine of formula 1 or a quaternary amine of formula 2, $R_1$, $R_2$, and $R_3$, can each independently be —$R_5$—Z.

When the second amine comprises a tertiary amine of formula 1 or a quaternary amine of formula 2, $R_5$ can be $C_1$ to $C_{10}$ alkylene. Preferably, $R_5$ can be $C_1$ to $C_6$ alkylene. More preferably, $R_5$ is ethylene.

When the second amine comprises a tertiary amine of formula 1 or a quaternary amine of formula 2, Z can be —OH or —$C(O)OR_6$.

Preferably, $R_1$ can be —$R_5$—Z, $R_5$ can be ethylene, and Z can be —OH.

Preferably, $R_2$ and $R_3$ can be —$R_5$—Z, $R_5$ can be ethylene, Z can be —$C(O)OR_6$, and $R_6$ can be methyl.

For Formula 30, $R_{10}$ can be $C_1$ to $C_{20}$ alkylene, arylene, cycloalkylene.

Preferably, $R_{10}$ can be $C_2$ to $C_6$ alkylene.

For Formula 30, $R_{11}$ and $R_{12}$ can independently be hydrogen, methyl, ethyl, propyl, butyl, pentyl, or hexyl. Preferably, $R_{11}$ and $R_{12}$ can be hydrogen or methyl. More preferably, $R_{11}$ and $R_{12}$ can be hydrogen For Formula 10 and 20, X can be —O— or —C(O)O—.

There are a number of factors that must be taken into account in determining the effective amount of the polyamine, the gas hydrate inhibitor, or the polyamine and gas hydrate inhibitor composition, including, but not necessarily limited to, the proportion of water in the fluid, the nature of the hydrocarbon, the nature of the hydrate-forming guest molecules, the temperature and pressure conditions that the mixture of hydrocarbon and water are subject to, the particular compound employed, etc. Routine experimentation with a particular set of conditions and/or in a specific system can determine the optimum dosage range to avoid the formation of problematic quantities of harmful gas hydrate masses.

The methods of the present invention involve contacting a hydrocarbon and water mixture with a suitable polyamine and gas hydrate inhibitor composition. When an effective amount of the polyamine or the polyamine and gas hydrate inhibitor composition is used, gas hydrate blockage is inhibited. In the absence of such an effective amount, gas hydrate blockage is not inhibited.

The contacting of the hydrocarbon and water mixture with the polyamine and gas hydrate inhibitor composition can be achieved in a number of ways, including mixing, blending with mechanical mixing equipment or devices, stationary mixing setup or equipment, magnetic mixing or other suitable methods, other equipment and means known to one skilled in the art and combinations thereof to provide adequate contact and/or dispersion of the polyamine or the polyamine and gas hydrate inhibitor composition into the mixture.

The various components of the composition can be mixed prior to and/or during contact. If needed or desired, the composition or some of its components may be optionally removed or separated mechanically, chemically, or by other methods known to one skilled in the art, or by a combination of these methods after the gas hydrate formation conditions are no longer present.

When considering the appropriate dose or whether additional doses of polyamine or polyamine and gas hydrate inhibitor composition are needed, the temperature, pressure, brine composition, brine volume, oil composition, oil volume, and gas composition are considered for a particular system to determine the effective amount of polyamine or the polyamine and gas hydrate inhibitor composition to inhibit gas hydrate formation under the conditions present for the particular system to be treated.

The polyamine or the polyamine and gas hydrate inhibitor composition is added into the mixture of hydrocarbons and water at any concentration effective to inhibit the formation of gas hydrate agglomerates under the given conditions. Accordingly, the effective amount of the composition can range from about 0.1 volume percent to about 10 volume percent based on the amount of produced water in the well system. Preferably, the effective amount of the compound can range from about 0.1 volume percent to about 5 volume percent. The effective amount of the compound can also range from about 0.5 volume percent to about 5 volume percent. Typically, the amount of produced water is based on the amount of produced water per day that is calculated from the average volume of production per day for a particular well. The effective amount of the polyamine and gas hydrate inhibitor composition can be provided to the system in one or more doses.

The polyamine or the polyamine and gas hydrate inhibitor composition can also have particular properties for advantageous use in a well, transport, or other system. For example, the composition can have a viscosity of less than 250 cP, preferably, less than 100 cP at about 4° C., to provide a composition that can be easily pumped throughout a system. The polyamine or the polyamine and gas hydrate inhibitor composition can preferably have a viscosity of less than 50 cP at about 4° C. as a neat liquid.

The compositions are advantageously stable for at least 2 years at temperatures of 0° C. and 50° C. The compositions are stable when they do not stratify or gel upon storage under these conditions.

The polyamine or the polyamine and gas hydrate inhibitor composition are chemically compatible with various elastomers and metals. Elastomers screened or compatibility can include Neoprene (i.e., polychloroprene), Hypalon® (chlorosulfonated polyethylene synthetic rubber), nitrile butadiene rubber (NBR), ethylene propylene rubber (EPR), Teflon® (polytetrafluoroethylene), Kalrez® (perfluoro hydrocarbon elastomer), high density polyethylene (HDPE), Nylon 11 (polyamide bioplastic), polyether ether keton (PEEK), ethylene propylene diene rubber (EPDM White), hydrogenated nitrile butadiene rubber (HNBR), Viton® A (perfluoro hydrocarbon elastomer), Viton® B (perfluoro hydrocarbon elastomer), and Chemraz® (perfluoro hydrocarbon elastomer). Metals screened for compatibility can include AISI 1018 carbon steel, Inconel® 625 nickel-chromium alloy, SS2507 stainless steel, copper, SS2205 stainless steel, Hastelloy C-276® (nickel-molybdenum-chromium alloy), SS304L stainless steel, and SS316L stainless steel. The elastomers and metals are screened for compatibility at the effective amount used in the system as described above. The compositions are chemically compatible with metals when they do not cause corrosion to occur to the stainless steel and mild carbon steel components of the system and are chemically compatible with elastomers when they do not cause mass change or swelling.

Also, the compositions preferably do not interfere or react with any corrosion inhibitor, scale inhibitor, or other production chemical additives that are used in the system.

Advantageously, the polyamine or the polyamine and gas hydrate inhibitor composition do not form emulsions or foams when stored or upon use in a system. Emulsion formation can cause water quality issues in disposal of the produced water and foaming of the produced liquid can cause handling and system upset problems.

The polyamine or the polyamine and gas hydrate inhibitor composition can also reduce friction or drag when fluids are transported. Thus, these compositions can act as drag reducers or friction reducers when added to the hydrocarbon fluids.

The methods are useful for inhibiting hydrate formation for many hydrocarbons and hydrocarbon mixtures. The methods are particularly useful for lighter or low-boiling, $C_1$-$C_5$ hydrocarbon gases or gas mixtures at ambient conditions. Non-limiting example of such gases include methane, ethane, propane, n-butane, isobutane, isopentane and mixtures thereof. Other examples include various natural gas mixtures that are present in many gas and/or oil formations and natural gas liquids. The hydrates of all these low-boiling hydrocarbons are also referred to as gas hydrates. The hydrocarbons may also comprise other compounds including, but not limited to, carbon dioxide, hydrogen sulfide, and other compounds commonly found in gas/oil formations or processing plants, either naturally occurring and/or used in recovering/processing hydrocarbons from the formation, and mixtures thereof.

The methods can be used at any pressure that allows formation of hydrocarbon gas hydrates. When the hydrocarbons in the mixture are lower boiling hydrocarbons or hydrocarbon gases at ambient conditions, the pressure is usually at or greater than atmospheric pressure (i.e. about 101 kPa), preferably greater than about 1 MPa, and more preferably greater than about 5 MPa. The pressure in certain formation or processing units or plants could be much higher, such as greater than about 20 MPa. There is no specific high-pressure limit.

The temperature for contacting the mixture with the compound or composition is usually approximately at or below ambient or room temperature. Lower temperatures tend to favor gas hydrate formation. At much higher temperatures, gas hydrates are less likely to form.

In addition to the polyamine or the polyamine and gas hydrate inhibitor composition, the composition may also include liquids. These liquids are generally solvents for the solid form of the polyamine and gas hydrate inhibitor composition. Representative polar solvents suitable for formulation with the composition include water, brine, seawater, alcohols (including straight chain or branched aliphatic alcohols such as methanol, ethanol, 2-ethoxyethanol, propanol, isopropanol, butanol, isobutanol, hexanol, 2-ethylhexanol, octanol, or decanol), glycols and glycol ether derivatives (e.g. ethylene glycol, 1,2-propylene glycol, 1,3-propylene glycol, hexylene glycol, ethylene glycol monobutyl ether, ethylene glycol dibutyl ether, or diethylene glycol monomethyl ether), ethers (e.g., ethylene glycol monobutyl ether (EGMBE), 2-butoxyethanol, Butyl Cellosolve™), ketones (e.g. methyl ethyl ketone, cyclohexanone, or diisobutyl ketone), amides (e.g., N-methyl-2-pyrrolidinone or N,N-dimethylformamide), and combinations thereof Representative nonpolar solvents suitable for formulation with the composition include aliphatic hydrocarbons such as pentane, hexane, cyclohexane, methylcyclohexane, heptane, decane, dodecane, or diesel; aromatic hydrocarbons such as toluene, xylene, heavy aromatic naphtha, fatty acids or derivatives thereof (e.g., amides, esters, or a combination of amide and ester derivatives), and combinations thereof.

The selection of a suitable solvent or combination of solvents provides a stable solution of the compositions during storage and stability and reduced viscosity for the composition when injected against a pressure of 1.3 MPa to 172 MPa. The solvent is present in the composition in the range from about 1 to about 99 wt. %, preferably from about 10 to about 99 wt. %, and more preferably from about 20 to about 99 wt. % of the total composition based on the weight of the total composition.

The compositions can include other means of gas hydrate inhibition, such as thermodynamic hydrate inhibitors and kinetic hydrate inhibitors. If mixtures of gas hydrate inhibitors are used, the mixture can be added to the hydrocarbon and water mixture through a single port or multiple ports. Alternatively, individual gas hydrate inhibitors can be added to separate ports to access the hydrocarbon mixture.

The composition can include other oil field flow assurance components including, but not limited to, a corrosion inhibitor, a scale inhibitor, a paraffin inhibitor, an asphaltene inhibitor, an emulsion breaker, a water clarifier, or a combination thereof.

The particular formulation of the composition depends upon the application of the composition and any additional treatments that will be used in conjunction with the polyamine and gas hydrate inhibitor composition. For example, if the composition will be injected with a paraffin inhibitor that is typically only formulated in nonpolar solvents, then solvents such as diesel, heavy aromatic naphtha, fatty acid methyl esters, xylene, or toluene, may be used. The composition can also be formulated in a nonpolar solvent to minimize the risk of incompatibility between the polyamine and gas hydrate inhibitor composition and the other oil field flow assurance components.

Alternatively, if the composition will be injected with a water soluble corrosion inhibitor or scale inhibitor, a polar solvent such as methanol, ethanol, isopropanol, 2-butoxyethanol, ethylene glycol, propylene glycol, or a combination thereof, can be used.

The methods can further comprise treating the fluid with one or more gas hydrate inhibitors in addition to the polyamine and gas hydrate inhibitor composition. A thermodynamic hydrate inhibitor and/or kinetic hydrate inhibitor can be formulated with the AA composition or added to the fluid separately. Individual inhibitors can also be added to the fluid at separate ports. The effective amount of thermodynamic hydrate inhibitor and/or kinetic hydrate inhibitor can be empirically determined based on the characteristics of the fluid being treated, for example, using the rocking cell test described herein.

To ensure effective inhibition of formation or agglomeration of gas hydrates, the polyamine or the polyamine and gas hydrate inhibitor composition should be injected prior to formation of gas hydrate agglomerates. The composition can be injected at the wellhead, at subsea, in a riser, or a flow line. Typically, the polyamine and gas hydrate inhibitor composition is injected at the wellhead or below the wellhead. The treatment can also be used for pipelines or anywhere in the system where there is a potential for gas hydrate formation.

The composition is introduced into the fluid by any means suitable for ensuring dispersal of the polyamine and gas hydrate inhibitor composition through the fluid being treated. Typically the polyamine or the polyamine and gas hydrate inhibitor composition is injected using mechanical equipment such as chemical injection pumps, piping tees, injection fittings, and the like. The polyamine or the polyamine and gas hydrate inhibitor composition can be injected as prepared or formulated in an additional polar or nonpolar solvent as described herein depending on the application and requirements. The polyamine or the polyamine and gas hydrate inhibitor composition can be pumped into the oil/gas pipeline by using an umbilical line. Also, capillary injection systems can be used to deliver the polyamine and gas hydrate inhibitor composition. U.S. Pat. No. 7,311,144 provides a description of an apparatus and methods relating to capillary injection, which is herein incorporated by reference.

Referring to the polyamines of the invention, the polyamines can generally be prepared by performing an addition reaction by reacting an amine ($H_2N-R_5-Z$) with a acrylate or acrylic acid ($H_2C=C(H)-Z$) to prepare a compound of Formula 1. The compound of Formula 1 can be further reacted with an alkylating group, such as an alkyl halide to form a compound of Formula 2. The compounds of Formula 1 and/or Formula 2 can then be reacted with a second amine with heating, and optionally, with an acid catalyst, to prepare an oligomer or polymer for use in the methods and compositions of the invention.

The term "heteroaryl," as used herein alone or as part of another group, denotes an optionally substituted monovalent monocyclic or bicyclic aromatic radical of 5 to 10 ring atoms, where one or more, preferably one, two, or three, ring atoms are heteroatoms independently selected from N, O, and S, and the remaining ring atoms are carbon. Exemplary heteroaryl moieties include benzofuranyl, benzo[d]thiazolyl, isoquinolinyl, quinolinyl, thiophenyl, imidazolyl, oxazolyl, quinolinyl, furanyl, thazolyl, pyridinyl, furyl, thienyl, pyridyl, oxazolyl, pyrrolyl, indolyl, quinolinyl, isoquinolinyl, and the like.

The term "heterocyclo," as used herein alone or as part of another group, denotes a saturated or unsaturated monovalent monocyclic group of 4 to 8 ring atoms, in which one or two ring atoms are heteroatom(s), independently selected from N, O, and S, and the remaining ring atoms are carbon atoms. Additionally, the heterocyclic ring may be fused to a phenyl or heteroaryl ring, provided that the entire heterocyclic ring is not completely aromatic. Exemplary heterocyclo groups include the heteroaryl groups described above, pyrrolidino, piperidino, morpholino, piperazino, and the like.

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

Unless otherwise indicated, the alkenyl groups described herein are preferably lower alkenyl containing from two to thirty carbon atoms in the principal chain and up to 60 carbon atoms. They may be straight or branched chain or cyclic and include ethenyl, propenyl, isopropenyl, butenyl, isobutenyl, hexenyl, and the like.

Unless otherwise indicated, the alkynyl groups described herein are preferably lower alkynyl containing from two to 30 carbon atoms in the principal chain and up to 60 carbon atoms. They may be straight or branched chain and include ethynyl, propynyl, butynyl, isobutynyl, hexynyl, and the like.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The terms "halogen" or "halo" as used herein alone or as part of another group refer to chlorine, bromine, fluorine, and iodine.

The term "-ene" as used as a suffix as part of another group denotes a bivalent substituent in which a hydrogen atom is removed from each of two terminal carbons of the group, or if the group is cyclic, from each of two different carbon atoms in the ring. For example, alkylene denotes a bivalent alkyl group such as methylene (—CH$_2$—) or ethylene (—CH$_2$CH$_2$—), and arylene denotes a bivalent aryl group such as o-phenylene, m-phenylene, or p-phenylene.

The term "hydrocarbon" as used herein describes a compound or substituent consisting exclusively of the elements carbon and hydrogen.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON(R$_A$)(R$_B$), wherein R$_A$ and R$_B$ are independently hydrogen, alkyl, or aryl), amino (—N(R$_A$)(R$_B$), wherein R$_A$ and R$_B$ are independently hydrogen, alkyl, or aryl), halo (fluoro, chloro, bromo, or iodo), silyl, nitro (—NO$_2$), an ether (—OR$_A$ wherein R$_A$ is alkyl or aryl), an ester (—OC(O)R$_A$ wherein R$_A$ is alkyl or aryl), keto (—C(O)R$_A$ wherein R$_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

"Aralkyl" means an aryl group attached to the parent molecule through an alkylene group. The number of carbon atoms in the aryl group and the alkylene group is selected such that there is a total of about 6 to about 18 carbon atoms in the arylalkyl group. A preferred aralkyl group is benzyl.

The term "amide" as used herein alone or as part of another group has the general structure of —NHC(O)—.

The term "ether" as used herein alone or as part of another group has the general structure of —O—.

The term "ester" as used herein alone or as part of another group has the general structure of —OC(O)—.

The term "carbonyl" alone or as part of another group has the general structure of —C(O)—.

"Inhibiting" includes both inhibiting and preventing the formation and agglomeration of hydrate crystals.

Unless otherwise indicated herein, "AA" means anti-agglomerant; "IPA" means isopropanol (isopropyl alcohol); "KHI" means kinetic hydrate inhibitor; "LDHI" means low-dosage hydrate inhibitor; "MeOH" means methanol; "NaCl" means sodium chloride; "PE" means pentaerythritol; and "THI" means thermodynamic hydrate inhibitor.

Having described the invention in detail, it will be apparent that modifications and variations are possible without departing from the scope of the invention defined in the appended claims.

EXAMPLES

The following non-limiting examples are provided to further illustrate the present invention.

Example 1: Synthesis of Polyamines

Step 1 (synthesis of intermediate 1A). Monoethanolamine (153.2 g, 2.46 moles) and 60 g of methanol was placed in the flask equipped in mechanical stirrer, condenser, and thermocouple. Methyl acrylate (422.24 g, 4.912 moles) was added dropwise to prevent a sudden increase of temperature due to the strong exotherm. The reaction mixture was stirred at room temperature for 48 hours and monitored by wet analysis. The tertiary amine content was preferred to be in the range of 97-99 mol %. The product was analyzed by wet analysis (e.g., Total Amine Value, Tertiary Amine mol %, and % solids) and instrumental methods (e.g., liquid chromatography/mass spectrometry (LC/MS) and nuclear magnetic resonance (NMR)).

Step 2. The solution of intermediate 1A (200.6 g) was placed in round bottom flask and 44.7 g of ethylenediamine was added. The reaction mixture was heated to 200° F. for three to four hours under nitrogen to facilitate methanol removal and then 0.5 g of p-toluenesulfuric•acid was added to catalyze the reaction. The reaction progress was monitored by wet titration (e.g., Total Amine Value, Tertiary Amine mol %) and FTIR (e.g., ester band vs amide band). To reduce the viscosity of the samples that was increasing from an increase in molecular weight of the polymer, deionized water was added slowly (Samples 20 and 4B). The reaction mixture was stirred for 10-14 hours to completion. The final product was analyzed by FTIR, GPC, and resulted in Total Amine Value, Tertiary Amine mol %, % solid by non-volatile residue, and acid number. Sample 4A was prepared by replacing water with monobutyl ethylene glycol.

Samples 15 and 10 were prepared according to step 2 in the procedure above. The ethylenediamine was replaced with 1,6-haxanediamine (HAD) or bis(hexamethylene)triamine (BHMT), respectively. The molar ratio of intermediate (step 1) to di- or tri-amine was 1:1 in all cases. The water used as a solvent was replaced with methanol, monobutyl ethylene glycol, or a mixture of thereof to prepare various products. In particular, a product was prepared using the process of Example 1 with the modification that no acid catalyst (e.g., p-toluenesulfuric•acid) was used and that water was replaced with monobutyl ethylene glycol as the solvent.

Properties of Products in Water Solvent

| Property | Sample 4B | Sample 15 | Sample 10 |
|---|---|---|---|
| Total Amine Value, meq/g | 3.414 | 2.913 | 3.266 |
| Tertiary Amine, mol % | 94.9 | 98.9 | — |
| % solid | 68.9 | 72.3 | 81.5 |
| Appearance | Yellow/dark yellow viscous solution | Yellow viscous solution | Amber viscous solution |

Example 2: High Pressure Autoclave Test

Figure 1:
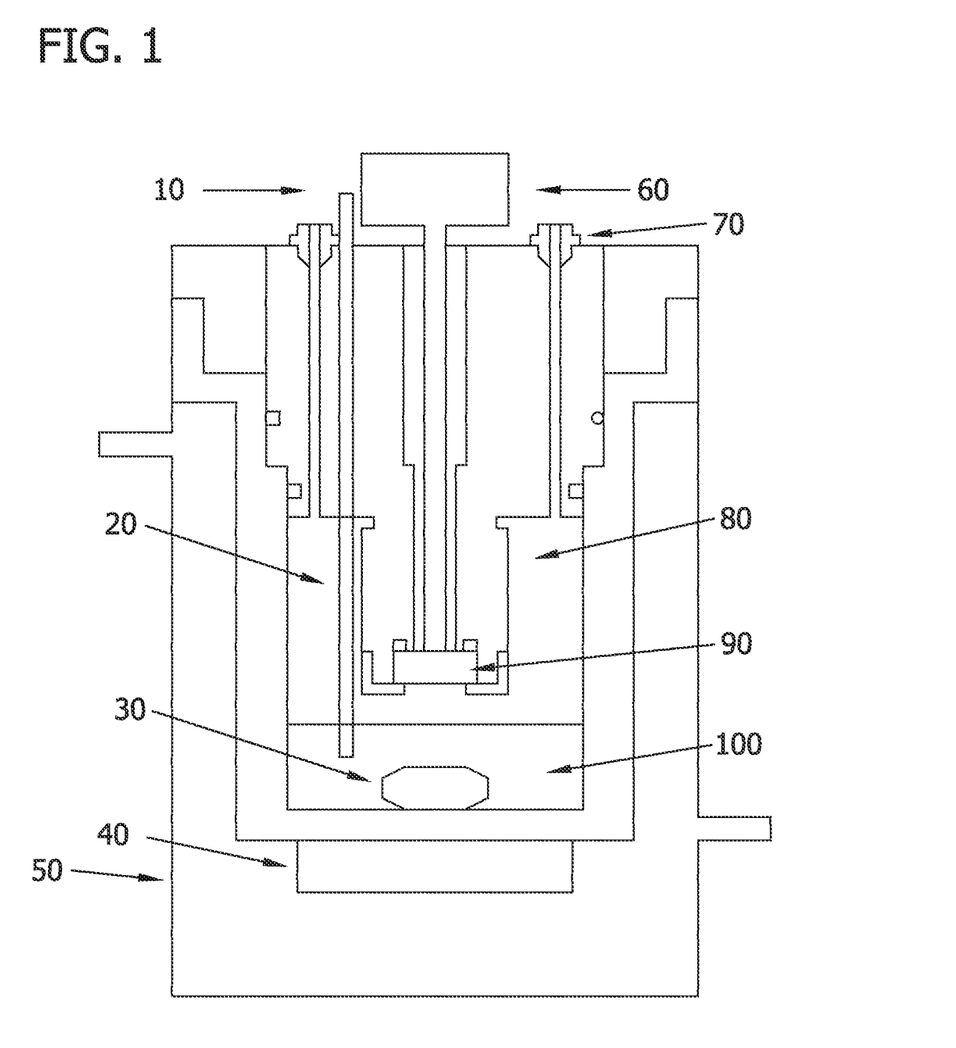
FIG. 1 is a schematic of an autoclave manufactured by PSL Systemtechnik.

An autoclave having the configuration of FIG. 1 is manufactured by PSL Systemtechnik of stainless steel and have integral magnetic stirrers. The test liquids 100 are in contact with the test gas 80 and there is a magnetic stirrer motor 40 with a magnetic follower 30 that is in contact with the test liquid 100. The sapphire window 90 is placed adjacent to the CCD camera and boroscope 60 and is also in contact with the test gas 80. The gas inlet and pressure relief 70 and gas outlet and pressure transducer 10 are both in fluid contact with the test gas 80. The PT 100 temperature probe 20 is in contact with the test liquid 100.

The temperature of the test fluids inside the autoclave is controlled by a circulating chiller unit. Both the stirrers and the chiller baths are computer controlled. Pressure and temperature data from the autoclave is continuously recorded by the controlling software. The autoclave is operated in a constant volume fashion, i.e., once the test pressure has been met, no further gas is added to the autoclave.

Autoclave tests are performed by adding water (or brine) and condensate (or oil) to the autoclave at ambient temperature and pressure. The total liquid volume inside the autoclave is normally 200 mL, which gives a gas:liquid ratio of 1.3:1. The KHI is then dosed and the autoclave cooled to the test starting temperature. The autoclave is then pressurized to the test pressure using a synthetic gas mixture simulating the field gas. The temperature and stirrer speed can then be controlled to replicate the field conditions. A stirrer rate of 500 rpm is used to replicate flowing conditions and 0 rpm for shut-in conditions.

The autoclave offers a good representation of the conditions inside a pipeline. The autoclave is also very sensitive to the formation of gas hydrates and low masses of hydrates can be detected in the cells both by pressure drop and visually (assuming the liquids are clear). Due to the automated control of the autoclaves, the tests can be performed with complicated cooling and flowing conditions.

Figure 2:
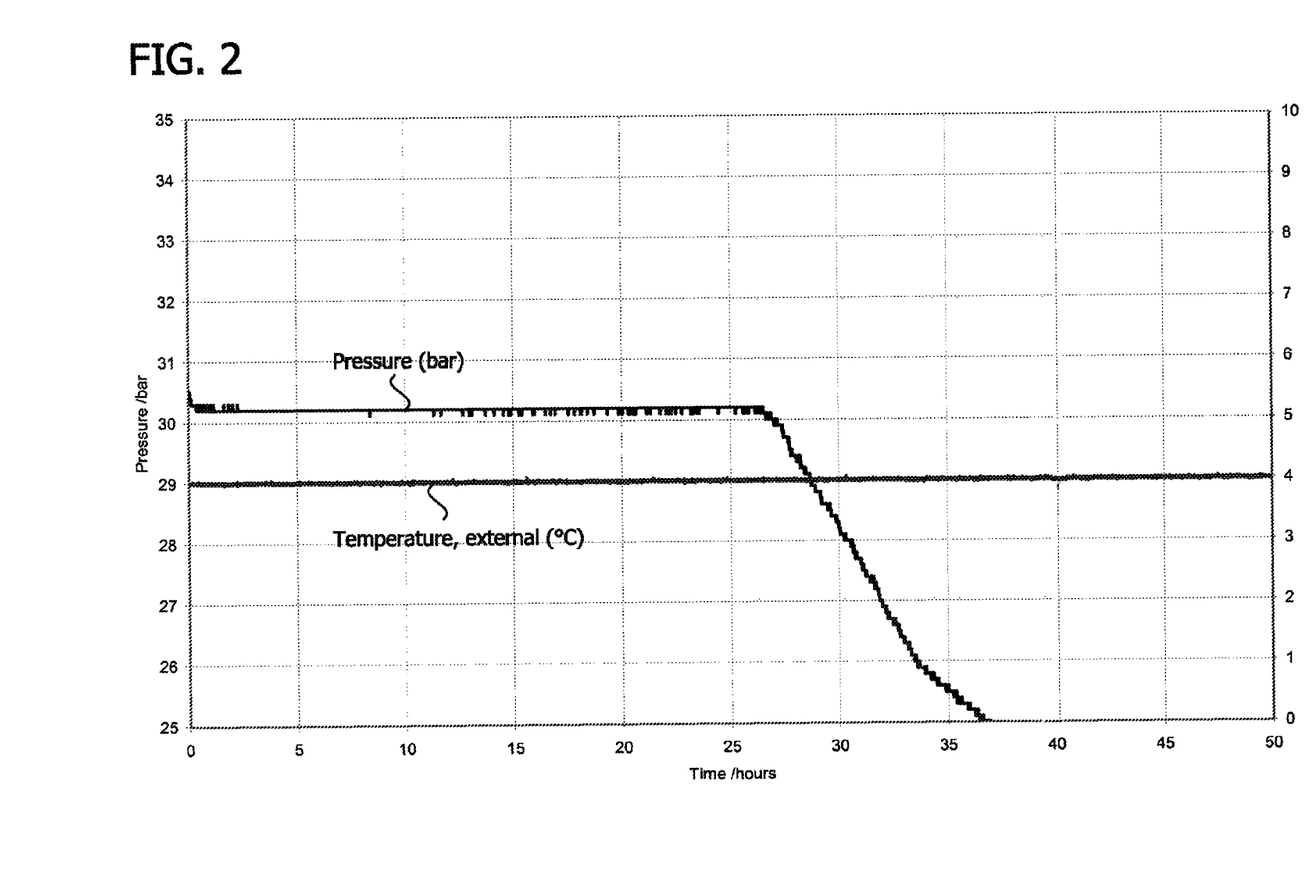
FIG. 2 is a graph of pressure versus time demonstrating a pressure drop upon gas hydrate formation.

As shown in FIG. 2, gas hydrate formation is detected by a sharp decrease in the pressure in the autoclave due to the incorporation of the gas molecules into the denser hydrate structure. There is often also a slight increase in temperature observed as the crystallization is an exothermic process (often this exotherm is not recorded in laboratory experiments as data points are only collected every 30 seconds and the temperature peak is missed). The formation of hydrates can be confirmed by using a high resolution CCD camera and boroscope to observe (and if necessary, record) the appearance of the liquids inside the autoclave.

In addition to the autoclave test, the performance of KHIs can also be evaluated using stainless steel rocking cells. Like the autoclave, this equipment allows the evaluation of chemical performance to be evaluated under constant volume conditions. Each cell has a dedicated pressure transducer and hydrate formation is detected by an observed pressure drop in the cell. The temperature inside each cell is not recorded, so there is no opportunity to detect the temperature increase due to hydrate formation.

The rocking cell equipment consists of a rack of five stainless steel cells mounted on a central axle immersed in a temperature-controlled bath. The bath temperature is moderated by a circulating chiller which is controlled by the integral computer. To rock the cells, the central axle is rotated by a computer-controlled stepper motor, which can rotate the cells up to 45° in each direction (that is, a 90° total rocking angle) at rocking rates of up to 20 times a minute. High-shear agitation of the fluids inside the cell is provided by the movement of a mixing ball (usually stainless steel although glass balls are also available) as the cells move. Each cell has a total volume of around 40 ml and will be filled with about 15 mL liquid which would give a gas:liquid ratio of ~1.7:1. Tests can also be performed to replicate the gas:liquid ratio of the autoclave or of the field.

The following Table shows results for various polyamines and KHI actives.

| Polyamine | KHI:Polyamine | KHI Active | Results/Hours |
|---|---|---|---|
| 15 | 2:1 | Inhibex ® 501 | 160, 160 |
| 15 | 2:1 | Inhibex ® 505 | 8, 40, 160 |
| 4A | 1:1 | Inhibex ® 501 | 9, 160, 160 |
| 4A | 1:1 | Inhibex ® 505 | 44, 160 |
| 4B | 1:1 | Inhibex ® 501 | 16, 160, 160 |
| 4B | 1:3 | Inhibex ® 505 | 140, 160 |

Additionally, formulations of Polyamine Sample 20 and Inhibex 501 designated 153A, 153B, and 153C were tested using the autoclave procedure described above.

|  | 153A (1:1) | 153B (2:1) | 153C (1:3) |
|---|---|---|---|
| Inhibex 501 | 15% | 20% | 7.5% |
| Sample 20 | 15% | 10% | 22.5% |

The formulations were tested at 5000 ppm based on the active KHI and the remainder of the formulation included water, monoethylene glycol, and EGMBE. The test was run using methane gas at 30 bar with a temperature of 7° C. and 6° C., respectively. The duration of the constant pressure condition before the pressure decreased due to gas hydrate formation was determined in hours.

| Formulation | Duration (test 1) | Duration (test 2) | Duration (test 3) | Duration (test 4) |
|---|---|---|---|---|
| 153A | 69 h | 69 h | 70 h | |
| 153B | 68 h | 68 h | 69 h | 29 h |
| 153C | 70 h | 70 h | 68 h | 67 h |
| 153A | 6 h | 20 h | 70 h | 67 h |
| 153B | 72 h | 72 h | 67 h | 67 h |
| 153C | 67 h | 67 h | | |

Additionally, the formulation of 153C was tested at 3000 ppm, 4000 ppm, and 5000 ppm using Mungo 2 gas at 5° C. with 100 mL DI (Deionized Water) and 100 mL Laws Condensate and duration of the high pressure condition in the autoclave was more than 160 hours for each sample.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawing[s] shall be interpreted as illustrative and not in a limiting sense.

What is claimed is:

1. A method for inhibiting gas hydrate formation in a fluid comprising a hydrocarbon and water, the method comprising adding to the fluid an effective amount of an inhibitor composition to inhibit gas hydrate formation in the fluid, the inhibitor composition comprising an polyamine derived from reaction of a first amine being a diamine, a triamine, or a polyamine, and a second amine of a tertiary amine of formula 1 or a quaternary amine of formula 2 having the structures of Formula 1

Formula 2 wherein
$R_1$, $R_2$, and $R_3$ are each independently —$R_5$—Z;
$R_4$ is alkyl;
$R_5$ is $C_1$ to $C_{20}$ alkylene, substituted $C_1$ to $C_{20}$ alkylene, arylene, aralkylene, or $C_1$ to $C_{20}$ alkylene wherein one or more of the —$CH_2$— groups of the alkylene group is replaced with an amide, a carbonyl, an ether, an ester, a cycloalkyl, or a heterocyclo functional group;
$R_6$ is independently hydrogen or alkyl; and
Z is —$NHR_6$, —OH, —$C(O)OR_6$, or —$C(O)NHR_6$.

2. The method of claim 1 wherein the inhibitor composition further comprises a gas hydrate inhibitor agent.

3. The method of claim 2 wherein the gas hydrate inhibitor agent is a polyvinylcaprolactone; a polyvinylpyrrolidone; a copolymer of a vinylcaprolactone and a vinylpyrrolidone; poly(N-alkyl(alkyl)acrylamide), a copolymer of N-alkyl(alkyl)acrylamide and alkyl chloride quaternary salts of N,N-dialkylaminoalkyl(meth)acrylates, a copolymer of N-alkyl(alkyl)acrylamide and alkyl chloride quaternary salts of N,N-dialkylaminoalkyl(meth)acrylamides, a terpolymer of a vinylcaprolactone, a vinylpyrrolidone, and a vinyl acetate; a dendrimeric polyesteramide derived from hexahydrophthalic anhydride; diisopropanol amine; and N,N-bis (3-dimethylaminopropyl)amine; a substituted polyethyleneimines; a polyoxyalkylenediamine; a dicarboxylic acid-polyol polyester; a polycyclicpolyether polyol; a hyperbranched polyester polyol having hydroxyl end groups; a hyperbranched polyester polyamine; a hyperbranched polyamidoamine; a linear polyester polyamine; or a combination thereof.

4. The method of claim 3 wherein the gas hydrate inhibitor agent comprises a copolymer of a polyvinylcaprolactone and a polyvinylpyrrolidone; a terpolymer of a polyvinylcaprolactone, a polyvinylpyrrolidone, and a polyvinyl acetate; or a combination thereof.

5. The method of claim 1 wherein the first amine is ethylene diamine, propylene diamine, butylene diamine, pentylene diamine, hexylene diamine, heptylene diamine, octylene diamine, nonylene diamine, decylene diamine, diethylene triamine, dipropylene triamine, dibutylene triamine, dipentylene triamine, dihexylene triamine, triethylene tetraamine, tripropylene tetraamine, tributylene tetraamine, tripentylene tetraamine, trihexylene tetraamine, tetraethylene pentaamine, tetrapropylene pentaamine, pentaethylene hexamine, pentapropylene hexamine, $N^1,N^2$-dimethylethane-1,2-diamine, $N^1,N^3$-dimethylpropane-1,3-diamine, $N^1,N^4$-dimethylbutane-1,4-diamine, $N^1,N^5$-dimethylpentane-1,5-diamine, $N^1,N^6$-dimethylhexane-1,6-diamine, p-diaminoethylbenzene, 1,4-diaminocyclohexane, or a combination thereof.

6. The method of claim 5 wherein the first amine is ethylene diamine, 1,6-hexylene diamine, or a combination thereof.

7. The method of claim 1 wherein the inhibitor composition comprises a tertiary amine of formula 1.

8. A method for inhibiting gas hydrate formation in a fluid comprising a hydrocarbon and water, the method comprising adding to the fluid an effective amount of an inhibitor composition to inhibit gas hydrate formation in the fluid, the inhibitor composition comprising an polyamine derived from reaction of a first amine being a diamine, a triamine, or a polyamine, and a second amine that is a quaternary amine of Formula 2

Formula 2 wherein
$R_1$, $R_2$, and $R_3$, are each independently —$R_5$—Z or two or more of $R_1$, $R_2$, and $R_3$ together with the nitrogen atom form a heterocyclo group;
$R_4$ is alkyl;
$R_5$ is $C_1$ to $C_{20}$ alkylene, substituted $C_1$ to $C_{20}$ alkylene, arylene, aralkylene, or $C_1$ to $C_{20}$ alkylene wherein one or more of the —CH$_2$— groups of the alkylene group is replaced with an amide, a carbonyl, an ether, an ester, a cycloalkyl, or a heterocyclo functional group;

R$_6$ is independently hydrogen or alkyl; and

Z is —NHR$_6$, —OH, —C(O)OR$_6$, or —C(O)NHR$_6$.

9. The method of claim 8 wherein R$_4$ is methyl, ethyl, propyl, or butyl.

10. The method of claim 1 wherein R$_5$ is C$_1$ to C$_{10}$ alkylene.

11. The method of claim 10 wherein R$_5$ is C$_1$ to C$_6$ alkylene.

12. The method of claim 10 wherein R$_5$ is ethylene.

13. The method of claim 12 wherein Z is —OH or —C(O)OR$_6$.

14. The method of claim 1 wherein R$_5$ is ethylene and Z is —OH.

15. The method of claim 1 wherein R$_5$ is ethylene, Z is —C(O)OR$_6$, and R$_6$ is methyl or ethyl.

16. The method of claim 8 wherein R$_5$ is C$_1$ to C$_6$ alkylene.

17. The method of claim 8 wherein R$_2$ and R$_3$ are —R$_5$—Z, R$_5$ is ethylene, Z is —C(O)OR$_6$, and R$_6$ is methyl or ethyl.

18. The method of claim 8 wherein the first amine is ethylene diamine, propylene diamine, butylene diamine, pentylene diamine, hexylene diamine, heptylene diamine, octylene diamine, nonylene diamine, decylene diamine, diethylene triamine, dipropylene triamine, dibutylene triamine, dipentylene triamine, dihexylene triamine, triethylene tetraamine, tripropylene tetraamine, tributylene tetraamine, tripentylene tetraamine, trihexylene tetraamine, tetraethylene pentaamine, tetrapropylene pentaamine, pentaethylene hexamine, pentapropylene hexamine, N$^1$,N$^2$-dimethylethane-1,2-diamine, N$^1$,N$^3$-dimethylpropane-1,3-diamine, N$^1$,N$^4$-dimethylbutane-1,4-diamine, N$^1$,N$^5$-dimethylpentane-1,5-diamine, N$^1$,N$^6$-dimethylhexane-1,6-diamine, p-diaminoethylbenzene, 1,4-diaminocyclohexane, or a combination thereof.

19. The method of claim 17 wherein the first amine is ethylene diamine, 1,6-hexylene diamine, or a combination thereof.

* * * * *